Aug. 27, 1935.   R. LAPSLEY   2,012,669
TRANSMISSION CONTROL MECHANISM
Filed June 29, 1931   3 Sheets-Sheet 3
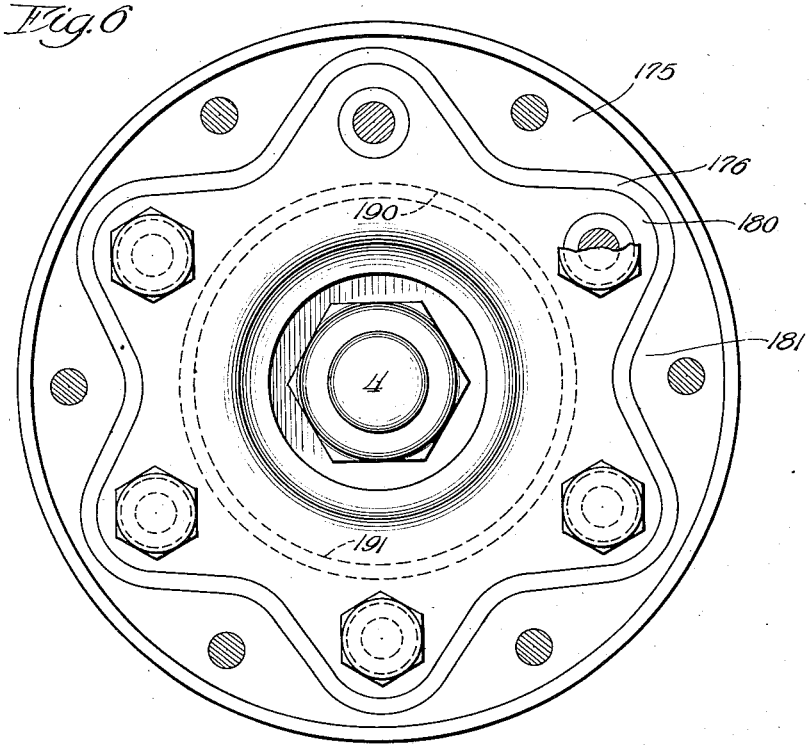
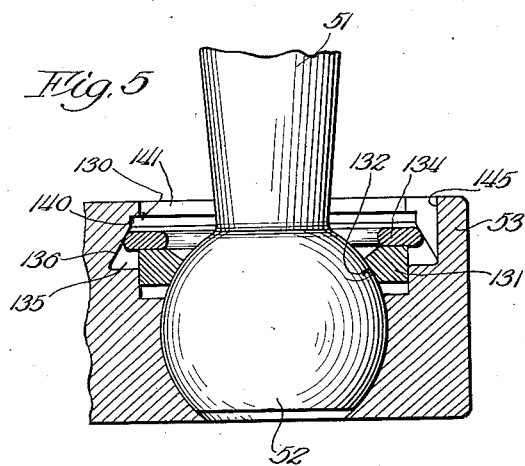 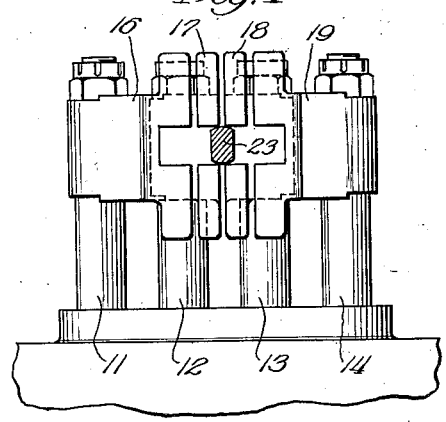
Inventor:
Robert Lapsley
By [signature]
Attys.

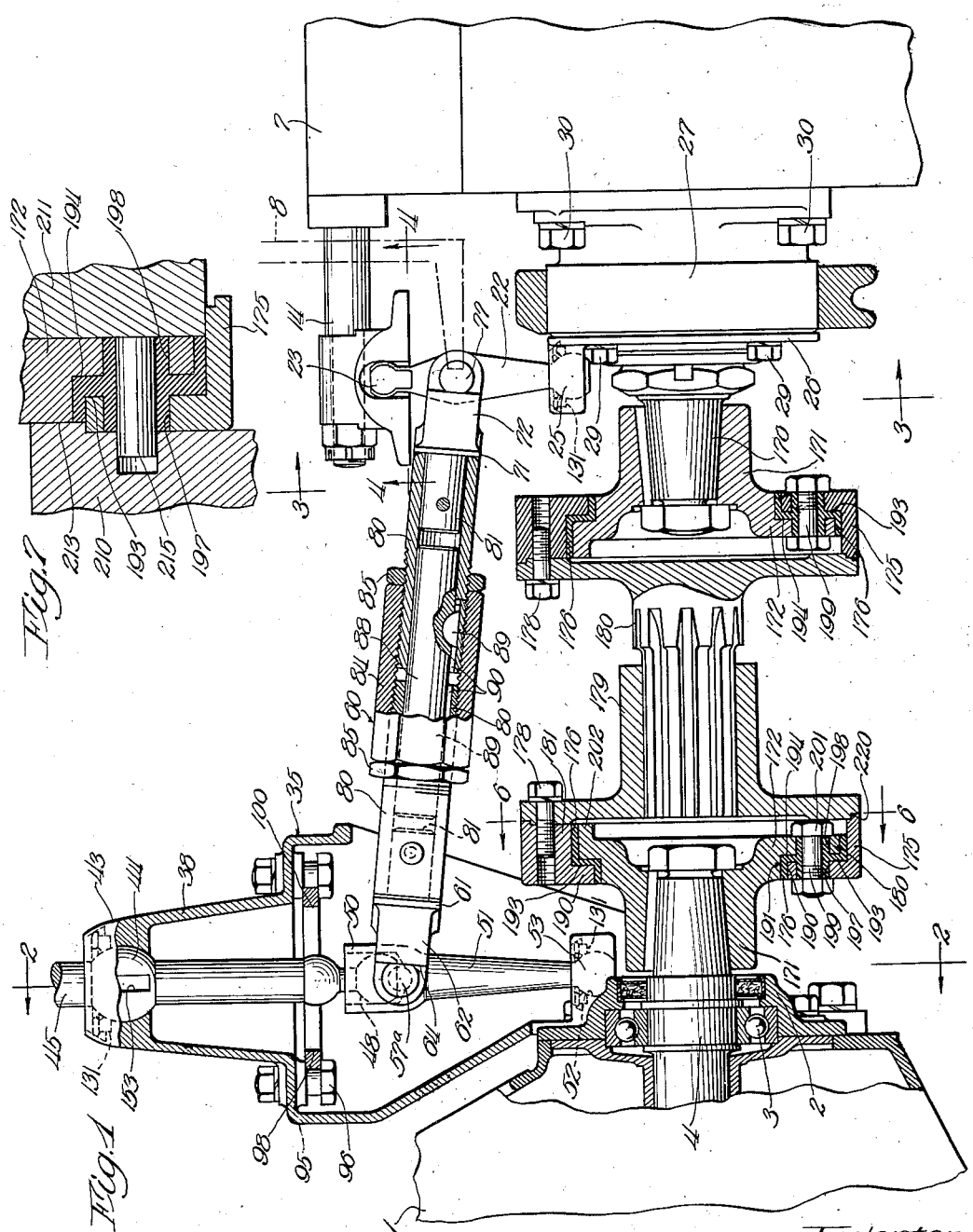

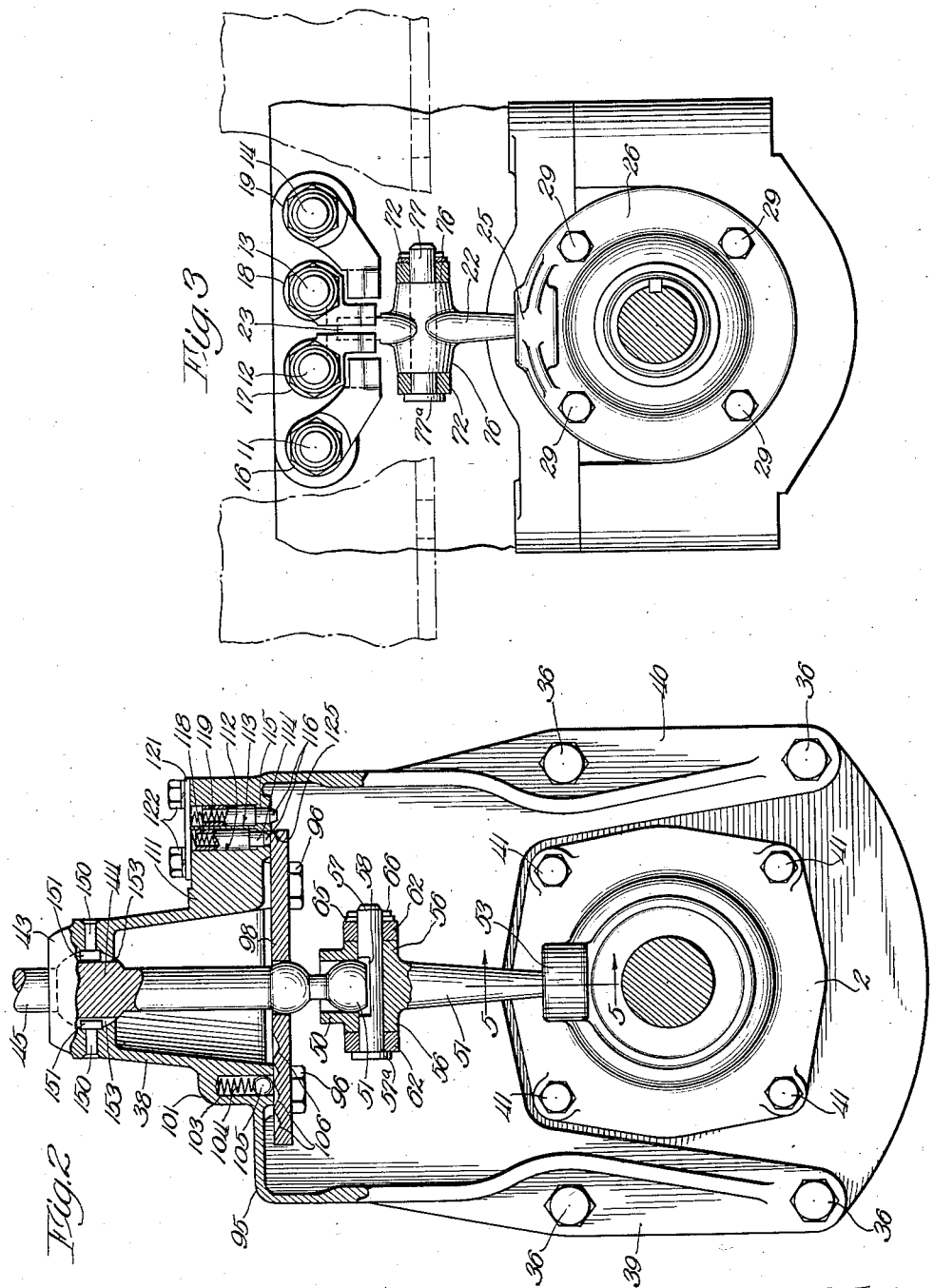

Patented Aug. 27, 1935

2,012,669

UNITED STATES PATENT OFFICE 2,012,669

TRANSMISSION CONTROL MECHANISM

Robert Lapsley, Berrien Springs, Mich., assignor to Clark Equipment Company, Buchanan, Mich., a corporation of Michigan Application June 29, 1931, Serial No. 547,577

17 Claims. (Cl. 74—473)

The present invention relates generally to transmission systems for use in automotive vehicles.

More particularly, the present invention relates to an improved construction of a gear shifting mechanism for selecting and bringing into operative relation the various desired gear ratios, particularly in busses, trucks, and other large vehicles. The present invention is also concerned with driving connections between the motor of an automotive vehicle and the transmission gear box generally spaced rearwardly of the automobile motor.

The principal object of the present invention is to provide an improved gear shifting mechanism which is so constructed and arranged that the manually operated gear shift lever can be mounted at a point spaced from the transmission gear box the gears of which are controlled by the gear shift lever by the usual gear shifting movements thereof. Specifically, I propose mounting the gear shift lever at a point forwardly of the transmission gear box. I find that this is an especially desirable arrangement since in large busses, trucks and the like the transmission gear box is usually separately supported from the main frame of the vehicle and at a point somewhat in rear of the motor and the motor clutch housing. This brings the transmission gear box too far to the rear of the vehicle for the gear shift lever to be mounted on the gear box, as is usual in the present day passenger car construction, and also in view of the fact that in busses, trucks, and the like it is desired to place the driver's seat as far forward as possible in order to realize the most amount of useable space.

Another object of the present invention in connection with the feature of mounting the gear shift lever forward of the transmission gear box is the provision of improved connections between the gear shift lever and the shift rods of the transmission so that the gear shift lever is normally moved in the same manner and substantially the same amount as it would be if it were mounted on the transmission gear box itself. This means that in my improved transmission system the gear shift lever is movable in exactly the same manner and to approximately the same extent as the gear shift lever in the present standard arrangements so that the employment of my improved gear shifting mechanism will not be confusing to the driver or operator who is skilled in the use of standard shifts.

Another object of the present invention, which is particularly advantageous when employed in my improved gear shifting mechanism referred to above but which may be employed in other situations, is the provision of an improved ball and socket mounting for the gear shift lever as well as for other levers utilized in my improved gear shifting mechanism. Briefly, my improved ball and socket mounting comprises a stationary socket receiving the ball or spherical head of the lever and which is provided with means which effectively holds the spherical head in place and yet which may be quickly and easily removed to permit disassembly of the ball and socket mounting, and is so arranged that accidental disassembly is effectively precluded.

Still further, another object of the present invention is the provision of improved cushioned driving connections between the motor and the transmission gear box spaced rearwardly thereof, which cushioned connections are arranged for easy assembly and shock absorbing ability yet capable of transmitting the driving torque under the most adverse conditions.

Still further, another object of the present invention is the provision of an improved latch means associated with the gear shift lever for the purpose of introducing an additional resistance to movement of the lever which corresponds to certain gear shifts or ratios which are infrequently utilized. The additional resistance to movement of the lever to engage these infrequently used gear ratios serves as a warning or indication to the operator that he is moving these gears into engagement so that if such movement of the gear shift lever was through inadvertence the attention of the operator is immediately drawn to his error. More particularly, my improved latch means comprises a latch plate having a slot to receive the lower end of the gear shift lever. The plate is movable laterally and spring means is associated with the plate to resist a predetermined movement thereof.

While I have outlined above some of the generic features of my invention, other objects and advantages thereof will be apparent to those skilled in the art after a consideration of the following detailed description of the preferred structural embodiment taken in conjunction with the accompanying drawings, in which:

Figure 1 is a longitudinal vertical section showing the principal parts of the present invention;

Figure 2 is a cross-sectional view taken substantially along the line 2—2 of Figure 1 and looking forwardly of the vehicle;

Figure 3 is a cross-sectional view taken substantially along the line 3—3 of Figure 1 and looking rearwardly of the vehicle;

Figure 4 is a view partly in section and partly in elevation and corresponding to a view taken substantially along the line 4—4 of Figure 1;

Figure 5 is an enlarged view showing the socket mounting for one of the levers and corresponding to a view taken along the line 5—5 of Figure 2;

Figure 6 is an enlarged cross-sectional view taken along the line 6—6 of Figure 1 and illustrates one of the cushioned driving connections; and Figure 7 is a cross-section illustrating one form of means for casting the resilient shock absorbing medium in place in one of the driving members.

Referring now more particularly to Figure 1, the reference numeral 1 indicates in its entirety the clutch housing of the motor of an automotive vehicle and as there shown includes a bearing plate 2 in which is journaled, as by anti-friction bearing means 3, the clutch shaft 4 which is normally driven by the motor of the vehicle. The transmission gear box 7 is spaced rearwardly of the clutch housing 1 and may be separately supported from the main frame of the vehicle by one or more cross members indicated in Figure 1 by the reference numeral 8. The transmission, of course, may be supported in any other manner desired.

The transmission includes the usual arrangement of selectively operated gears arranged to establish different gear ratios. In order to illustrate the present invention I have chosen a transmission of the type providing two reverse drives and five forward speeds although this, of course, may vary. For selecting and changing the various gear ratios the transmission 7 is provided with four shift rods 11 to 14, inclusive, see Figure 4, projecting forwardly of the gear box 7. The shift rods carry at their forward ends shift lugs or fingers 16 to 19 inclusive, each of which is slotted as best shown in Figure 1 for selective engagement by a short lever 22 the upper end 23 of which is reduced and rounded to facilitate such engagement.

The short lever 22 is swiveled for rocking movement in a socket mounting 25 carried on a plate 26 secured to the forward end of a bearing sleeve 27 projecting forwardly from the transmission box or housing 7. Preferably, the plate 26 is secured to the bearing sleeve 27 by means of stud bolts 29 and the bearing sleeve 27 is secured to the transmission housing by stud bolts 30.

A mounting bracket indicated in its entirety by the reference numeral 35 is secured to the clutch housing 1 by bolts 36 as best shown in Figure 2. The mounting bracket 35 comprises an upper pedestal portion 38 and lower forked members 39 and 40 through which the bolts 36 pass and which embrace the bearing plate 2, the latter being secured to the clutch housing 1 by means of bolts 41.

The other portion of the pedestal 38 carries the socket mounting 43 in which is swiveled for universal movement the spherical head 44 on the manually operated gear shift lever 45.

The lowermost end 48 of the gear shift lever 45 is rounded substantially in the form of a ball thereon. The ball end 48 is received within the cylindrical cup portion 50 of a rocking lever 51 the lower end 52 of which is also rounded and is received within a socket mounting 53 similar in form to the socket mounting 43 described above. The socket 53 is preferably formed integrally with the bearing plate 2 although it may, if desired, be separately formed and secured to the clutch housing 1 in any manner. By virtue of the cup and ball connection between the lower end of the gear shift lever 45 and the rocking lever 51 it will be apparent that as the gear shift lever 45 is moved through the various gear shifting movements the rocking lever 51 will be caused to execute a corresponding movement.

The connections I have provided between the rocking lever 22 and the rocking lever 51 by which the former is constrained to move with the latter will now be described. As best shown in Figure 2 the rocking lever 51 carries near its upper end laterally directed bosses 56 which are bored to receive a pivot pin 57. It is desired that the pivot pin 57 be placed as high as possible on the lever 51 and hence the pivot pin 57 is preferably notched, as at 58, to accommodate the lower end of the rounded ball end 48 on the lever 45.

The forward end of a connecting link indicated in its entirety by the reference numeral 60 is in the form of a forked member 61 the ears 62 of which are received on either side of the lever 51 opposite the bosses 56 thereof and are apertured to receive the pivot pin 57 as best shown in Figure 2. The uppermost portion of the ears 62 are offset, as at 64, and so dimensioned that the head 57a of the pivot pin 57 which is milled away to provide a flattened portion is snugly received against the abutting wall of the recessed portion 62 whereby the pivot pin 57 is prevented from turning. The other end of the pivot pin 57 carries a washer 65 held in place by means of a cotter key 66. The opposite or rear end of the connection 60 is pivoted to the short lever 22 in substantially the same manner. The rear forked member 71 is provided with ears 72 which are pivoted to the lever 22 by means of a pivot pin 77, see Figure 3, the head 77a of which is flattened and is received against the wall of the recessed portion in the same manner as described above. The short lever 22 carries the laterally directed bosses 76 in which the pivot pin 77 is journaled.

In order to establish a substantially rigid connection between the forked members 61 and 71 I provide each of these members with a sleeve 80 secured thereto. For this purpose each of the forked members has a stem 81 over which the sleeve 80 is pressed and then welded or pinned or otherwise secured in place. The other end of each of these sleeves is threaded, preferably in opposite directions, and threadedly received thereon is a coupling member 84 which is rotatable to bring the sleeves 80 closer together or farther apart. Lock nuts 85 serve to hold the coupling 84 in adjusted position.

The forked members 61 are also connected together by means of a slidable rod 88. This rod carries a key 89 at each end, each key being fixed in the rod 88. These keys 89 are received within an elongated slot 90 formed in each of the adjacent ends of the sleeves 80, as best shown in Figure 1. The slots 90 are longer than the keys 89 and hence the rod 88 is capable of sliding or floating movement in the two sleeves 80, and because of the key and slot construction one sleeve is constrained to rock or rotate with the other. Where I have shown a key and slot construction it is to be understood that the rod 88 may be splined in the sleeves 80 or otherwise constructed to secure an equivalent result.

The operation of my improved gear shift connecting means is substantially as follows. When the manually operated gear shift lever 45 is rocked laterally of the vehicle to select one of the gear shift rods 11 to 14 the gear shift lever 45 moves about its ball and socket connection 43. The swinging of the lower end 48 of the gear shift lever 45 causes the lever 51 to be rocked laterally and this movement, which is really one of rotation, is transmitted to the forward forked member 61 and to the rod 88 and coupling 84. The movement of these latter elements causes the sleeve 89 and the rear forked member 71 to be rocked laterally through substantially the same angle as the lever 51. As will be clear from Figure 3 the rocking of the short lever 22 will cause the upper end 23 thereof to select one of the shift lugs 16 to 19 in substantially the same manner the lower end of the gear shift lever would select one of them if the gear shift lever were mounted directly on the transmission gear box in the usual manner. The above described connecting means between the lever 51 and the short lever 22 is therefore substantially rigid as far as transmitting torque due to the rocking of the lever 51 is concerned. Thus, when the lever 51 is rocked to one side the short lever 22 is rocked substantially the same amount and in the same direction. When the coupling 84 is loosened as by backing off the nuts 85 the coupling 84 may be rotated to adjust the effective lengths of the connecting link 60. It will be evident, however, that it is not necessary that the coupling 84 be tight in order to cause the lateral rocking movement of the lever 22 by the lateral rocking of the lever 51. This is true because the floating rod 88 being splined to both of the sleeves 89 will effectively transmit the rocking movement from one of the levers to the other. This particular construction is advantageous in that no harm will result should the coupling 84 ever become loose through inadvertence or otherwise.

It is, of course, obvious that as the manually operated gear shift lever is moved forwardly or rearwardly the short lever 51 is rocked in the same plane and will cause the rear lever 22 to be rocked forwardly or rearwardly. This movement will shift the selected one of the shift rods in the usual manner to effect driving engagement in the selected gear ratio.

Associated with the manually operated gear shift lever 45 is an improved latch or shift restraining mechanism which will now be described. The bracket 35 secured to the clutch housing 1 is widened at an intermediate point, as at 95, and this portion which is somewhat near the lower end of the gear shift lever 45 carries a plurality of bolts 96 which slidably support and position a slidable plate 98, as best shown in Figures 1 and 2. This plate is provided with an elongated slot 100 which is substantially the width of the lower end of the gear shift lever 45. The portion of the gear shift lever 45 operating in the slot 100 is rounded to facilitate securing an operating fit therein. The slot 100 is of substantial length and is designed to permit movement of the gear shift lever in one plane without entailing any consequent movement of the latch plate 98. When, however, the gear shift lever 45 is moved in a plane at right angles to the first mentioned plane the latch plate 98 moves with the lower end of the gear shift lever 45.

The latch plate 98 is so arranged in the bracket 95 that lateral movement of the gear shift lever 45 moves the latch plate 98 but fore and aft movement of the gear shift lever will take place in the slot 100 and will not move the latch plate 98. As explained above, the lateral movement of the gear shift lever 45 causes the short lever 22 to select one of the shift rods while longitudinal or fore and aft movement of the gear shift lever 45 swings the lever 22 in a longitudinal plane to shift the selected one of the gear shift rods. A boss 101 is formed at one side of the pedestal 38 and is bored, as at 103 in Figure 2, to receive a coil spring 104 which resiliently urges a ball 105 into engagement with one of a series of small notches or countersinks 106 for the purpose of yieldingly holding the latch plate 98, and hence the levers 51 and 22, in a lateral position corresponding to one of the selected gear ratios.

It was stated above that the transmission 7 was one which provides two reverse drives and five forward speeds. Under normal operating conditions reverse drive is not used very often and hence in this type of transmission the two reverse drives may be arranged to be controlled by one of the outer shift rods. Furthermore, it is also infrequent that the lowest forward and the second forward speed are utilized, and generally the gear means for effecting these drives are arranged to be controlled by the shift rod adjacent the outer shift rod mentioned above, most of the driving being done under normal conditions in either third, fourth, or fifth forward speeds. In such a transmission it is therefore desirable to provide some sort of means for preventing the operator from accidentally engaging one of the infrequently used shift rods. It is to be understood, of course, that the feature of my invention is equally applicable to transmissions controlling the lowest forward drive and the lowest reverse drive by the same shift rod, or other arrangements.

Opposite the boss 101 is a second boss 111 which is provided with a pair of closely spaced bores 112 and 113. Spring pressed plungers 114 and 115 are respectively mounted in the bores 112 and 113 and each plunger carries a lower cam projection 116 in a position to be engaged by one edge of the latch plate 98. Springs 118 and 119 are associated respectively with the plungers 114 and 115 and are held in the bores 112 and 113 by means of a closure plate 121 fastened to the boss 111 by means of screws or bolts 122. The edge of the latch plate 98 adjacent the plungers 114 and 115 may, if desired, be provided with a cooperating cam surface 125.

From Figure 2 it will be apparent that as the latch plate 98 is moved from the left to the right the plunger 114 is first engaged. This corresponds to a position in which the shift rod controlling the two lowest forward speeds is about to be engaged. It is necessary, therefore, for the operator to exert an additional effort to cause the cam surface 125 to cam the plunger 114 upwardly against the force of its spring 118. Hence, if the movement of the gear shift lever toward a position engaging the shift rod referred to the operator's attention is immediately directed to the fact that he is about to engage that shift rod. If it is actually desired to engage either low or second speed forward all it is necessary for the operator to do is to apply sufficient additional effort to cam the plunger 114 upwardly to allow the latch plate 98 to be moved laterally sufficient to cause the ball 105 to engage in the next to last depression 106 at the left hand edge of the latch plate 98 as viewed in Figure 2. This will then correspond to a position of the gear shift lever if either first or second speed forward is to be engaged. Once the plunger 114 is moved upwardly its effect as far as resisting movement of the latch plate 98 is concerned is materially reduced as compared to the effect it exerts when the latch plate first strikes the lower end 116 of the plunger 114.

When the gear shift lever 45 is actuated to move the latch plate 98 laterally to cause the cam surface 125 to engage the outer plunger 115 a second resistance is introduced to warn the driver that he is about to engage the outermost gear shift rod which controls the two reverse rods. This second resistance is somewhat greater than the first additional resistance because of the fact that after the latch plate has overcome the resistance of the first plunger 115 and has been brought into abutting engagement with the second plunger 115 the first plunger 115 is pressed against the top surface of the latch plate 98 and introduces a certain amount of resistance to movement of the latch plate which is added to the resistance created by the second plunger 115. Thus, there is practically no possibility whatsoever of the driver accidentally engaging one of the reverse drives without actually intending to effect it.

The socket mountings for the levers 22, 45, and 51, are all substantially identical in their essential characteristics and will be more clearly understood from Figure 5 where the mounting of the lever 51 in the socket 53 is shown enlarged and in detail. The ball end 52 of the rocking lever 51 is substantially spherical and is seated in the socket member 53 the lower portion of which is spherical in outline to correspond to the surface of the ball end 52. The upper portion 130 of the socket recess is substantially cylindrical and is of somewhat greater diameter than the diameter of the ball or spherical head 52. A retaining ring 131 is slidably mounted in the cylindrical recess 130 and is formed with an inner surface 132 to correspond to the spherical surface of the head 52. In order to retain the head 52 in its seat in the socket mounting 53 it is desirable to provide some sort of means for resiliently urging the retaining ring 131 downwardly against the upper part of the head 52. The means I have provided for this purpose comprises a split spring ring 134 having rounded inner and outer circumferences and adapted to seat in a recess or groove 135 having an upper wall 136 which is tapered so as to converge in an upward direction. The inherent resiliency of the spring ring tends to cause the same to expand and this tendency being exerted against the tapered or inclined upper wall causes the ring 134 to exert a downward force against the retaining ring 132.

The upwardly converging wall 136 terminates in a groove 140 which forms a ledge 141 directed inwardly of the recess 130 and which serves as a stop to prevent the accidental displacement of the spring ring 134. That is, should the head 52 be moved upwardly with an excessive force the spring ring 134 would be compressed as it is moved by the movement of the head up toward the top of the tapered wall 136. However, by virtue of the abrupt walls of the ledge 141 the spring ring 134 cannot be forcibly moved out of the recess 130 by an upward movement of the lever head 52.

For purposes of assembly and disassembly it is necessary, however, to provide some means to permit the easy insertion and removal of the head 52. For this purpose I form a small vertical slot 145 which permits a tool, such as a screw driver or the like, to be inserted in the recess 130 and behind the spring ring 134. It is then a simple matter to pry the spring ring 134 out of the recess 130 entirely, and after this is done the lever 51 and the retaining ring 131 may simply be lifted out of the socket mounting 53.

Since the other levers, 22 and 45, are mounted in a similar way a detailed description is believed necessary. In connection with the gear shift lever 45, however, it is to be noted that the socket 43 is provided with a pair of opposed bores each of which receives a pin 150. A small roller 151 is journaled on the inner end of each of the pins 150. These rollers are received within a vertical slot 153 formed on either side of the spherical head 44 of the gear shift lever 45. The purpose of this construction is to permit the gear shift lever to have full universal movement in its socket mounting 43 while precluding the rotation of the gear shift lever 45 which might place the upper end of the same out of proper position with respect to the driver's or operator's seat.

Since the transmission gear box 7 is spaced rearwardly of the clutch housing 1 and is separately supported it is necessary to provide some form of flexible driving means between the clutch shaft 4 and the driving transmission shaft 170 which projects forwardly from the transmission gear box 7 and is journaled in the bearing sleeve 27 in the usual manner. Referring now more particularly to Figure 1, the reference numeral 171 indicates a sleeve keyed or otherwise secured to the clutch shaft 4 driven by the motor of the vehicle. The sleeve 171 is provided with a radially extending flange 172 of particular formation later to be described in detail. A ring member 175 embraces and encircles the flange 172 and is resiliently connected therewith by means of an interposed resilient molded or cast insert 176. Substantially the same construction is mounted on the forwardly projecting transmission driving shaft 170, the flanged sleeve 171 being keyed thereto in exactly the same manner as the sleeve 171 is keyed to the clutch shaft 4.

The two ring members 175 are connected together by a pair of male and female members, one member being connected to the forward ring 175 and the other being connected to the rear ring member 175, such connection being established by means of cap screws 178. The female member 179 receives in splined engagement the male member 180. By virtue of this construction some longitudinal displacement is permitted and the resilient cushioning material 176 acts as a shock absorbing medium and also permits of a limited amount of angular displacement of the shafts 4 and 170.

Preferably, the flange 172 and the ring 175 are arranged with their adjacent surfaces in the form of a plurality of scallops which form undulating surfaces between which the resilient cushioning material is cast or molded, as best shown in Figure 6. Any number of scallops, indicated by the reference numerals 181 and 182, may be provided. By virtue of the fact that these scallops provide a circumference on the flanged sleeve and a cooperating surface on the ring member 175 which are spaced at various radial distances from the center of location of the driving shaft 4 an interlocked driving connection is established between the flange and the ring. The driving torque is, however, transmitted through the resilient cushioning medium 176, a portion of which acts in compression and a portion of which acts in tension to resist shear. As best shown in Figure 1, this cushioning medium is interposed between the adjacent surfaces of the two cooperating members 172 and 175.

The ring member 175 includes an inwardly directed flange 190 the inner surface or edge of which is substantially circular and in assembled relation lies closely adjacent to a shoulder 191 formed on the sleeve 171 intermediate the hub thereof and the flange 172. Between the inwardly directed flange 190 and the scallops 181 on the ring member a ledge 193 is provided and which lies adjacent a corresponding ledge 194 formed on the flanged sleeve 171 between the hub thereof and its flange portion 172. The cushioning material is also interposed between these shoulders and ledges just described as well as between the scallops 180 and 181 as set forth above.

It is preferable that some sort of positive connecting means be provided between the ring member 175 and the flange 172 in addition to the cushioned interlocking or scalloped connection described above. As will be understood from Figure 1 the scallops 180 on the flanged sleeve overlap the ledge surface 193 formed on the inwardly directed flange 190 of the ring member 175. Aligned bores 197 and 198 are formed in these overlapping portions and bolt means 199 is inserted in these aligned bores. Preferably, however, the bores 197 and 198 are of substantially greater diameter than the diameter of the bolt means 199 so that a quantity of the cushioning resilient material can be interposed between the walls of the bores and the surface of the bolt 199. In this way there is no metal to metal contact between any of the bolts 199 and the associated bores on either of the members 172 or 175.

In order to provide as many opposed surfaces as possible the flange 172 on the sleeve 171 carries an integral rib 202 which extends rearwardly in an axial direction. It is necessary, however, that this rib 202 be interrupted to provide space for the heads 201 of the bolts 199.

Reference has been made above to the cushioning or resilient material or medium interposed between adjacent surfaces of the associated members 172 and 175 and the securing means 199. This cushioning or resilient material 176 may take the form of rubber or some similar compound and may be molded to the proper form and inserted between the members 172 and 175 but preferably this material is cast directly between the members 172 and 175 when they are held by any suitable means (not shown) in their proper assembled position. In Figure 7 I have shown more or less diagrammatically one suitable form of mold means by which the rubber cushioning material may be cast in place between the members 172 and 175. The reference numerals 210 and 211 represent respectively the two members of the mold. As shown in Figure 7, it is to be noted that the members 172 and 175 are, in the casting operation, held further apart than the position these parts take when in assembled driving relation. That is, the ledges 193 and 194 are farther apart when the rubber compound is cast between the members 172 and 175 than they are when the members are properly assembled on the clutch shaft 4. In order to provide for this the mold jaw 210 carries a projection or shoulder 213 which serves to hold the member 172 in proper spaced position relative to the other member 175 for the casting operation. The mold jaw 211 also carries a pin or stud 215 which occupies a position substantially centrally of the aligned bores 197 and 198 and is for the purpose of providing an aperture to receive the securing bolt means 199.

After the casting operation has been completed and the cushioning material has hardened or set the members 172 and 175, now held together by virtue of the interposed cushioning material, are removed from the mold jaws 210 and 211. The bolts 199 are now inserted in the openings made by the studs 215 on the mold jaw 211, the bolts 199 being inserted with their heads 201 occupying a position in the interruptions in the rib 202 as explained above. Nuts are then threaded onto the bolts 199 and uniformly tightened. This tightening operation serves to compress the cast rubber compound and is continued until the outer surfaces of the members 172 and 175 are brought into alignment. This compression of the cushioning material imparts to the same an initial stress which causes the material to completely fill all the space between the adjacent surfaces of the members 172 and 175 whereby these members are capable of transmitting the driving torque without any lag or lost motion.

After the members 172 and 175 have been brought to their proper position by tightening the bolts 199 the driving member 179 (Figure 1) is secured to the ring member 175 by inserting and tightening the set screws 178. If desired, cooperating ledge or shoulder means 220 may be formed on the members 175 and 179 for the purpose of properly centering these members and facilitating their assembly.

While I have described in detail the cushioned connecting means between the sleeve member 171 and the member 179 it is to be understood that substantially identical construction is provided between the driving member 180 and the rear sleeve member 171 which is keyed to the transmission driving shaft 170. In this way the driving connection between the clutch shaft 4 and the transmission driving shaft 170 is flexible in any direction and is also capable of absorbing shocks and accommodating axial changes of the shafts 4 and 170 due to distortion of the frame means separately supporting the clutch housing 1 and the transmission gear box 7 and to other causes.

While I have shown and described above the preferred structural embodiment of the present invention it is to be understood that my invention is not to be limited to the specific means shown and described but that, in fact, widely different means may be employed in the practice of the broader aspects of my invention. For example, I have illustrated a particular transmission having more than the usual number of gear shifts, but it is to be understood that other forms of transmissions may be employed with the improved gear shifting mechanism and driving connections described above.

What I claim, therefore, and desire to secure by Letters Patent is:

1. In a transmission system for automobiles the combination of a transmission housing including shiftable gear means, a gear shift lever, means mounting said lever intermediate its ends for universal movement and forward of said housing, shift rods projecting forwardly of said housing, shift lugs thereon, shift means having a portion substantially in the horizontal plane of the lower end of said gear shift lever and adapted to selectively engage and move said shift rods, and connections between said shift means and said gear shift lever causing the above mentioned portion of said shift means to move with said lower end of the gear shift lever.

2. In a transmission system, a gear box, shift rods projecting forwardly therefrom, a short lever swiveled to the forward part of said gear box and having its upper end arranged to selectively engage and move said shift rods, a manually operated gear shift lever mounted forwardly of said gear box, a second short lever swiveled below said gear shift lever and having its upper end connected to the lower end of said gear shift lever, and means constraining the first short lever to move with the second short lever, whereby movement of the gear shift lever will cause the first named short lever to selectively engage and move said shift rods.

3. In a transmission system, a gear box having a plurality of shift rods, a movable member adapted to selectively engage and shift said rods, a gear shift lever mounted in a position spaced from said gear box, and adjustable connections between said gear shift lever and said movable member arranged to cause the upper end of said member to execute substantially the same movements as the lower end of said gear shift lever, said connections comprising a forked sleeve pivoted to said movable member for movement about a transverse axis, a swiveled lever actuated by the gear shift lever, a second forked sleeve pivoted to said swiveled lever for movement about a transverse axis, telescopic means connected with said sleeves and arranged to prevent relative rotation therebetween, and an adjustable coupling threadedly connecting said sleeves and arranged to prevent relative displacement thereof.

4. In a transmission system, a gear shift lever, a swiveled mounting therefor, a latch plate for said lever supported in said mounting for movement in one direction and provided with an elongated slot extending in a direction at right angles to said first direction and arranged to receive the lower end of said lever, whereby when the gear shift lever is shifted in one direction its lower end slides in said slot and when the gear shift lever is shifted in a direction at right angles thereto said plate is shifted in said mounting, and spring projected means serving to oppose movement of said plate and to hold said plate in any one of a plurality of shifted positions.

5. In a transmission system, a clutch housing, a clutch shaft journaled therein, a socket mounting secured to said housing, a transmission gear box mounted in spaced relation to the clutch housing, a bearing sleeve secured to said gear box and projecting forwardly therefrom, a transmission driving shaft journaled in said bearing sleeve in axial alignment with said clutch shaft, a plurality of shift rods projecting from the gear box, a second socket mounting on said bearing sleeve, a lever swiveled therein and adapted to selectively actuate said shift rods, a lever swiveled in said first socket mounting, and connections between said two levers whereby movement of the lever in the first socket mounting actuates the other lever to shift the gears.

6. In a transmission system, a clutch housing, a clutch shaft journaled therein, a socket mounting secured to said housing, a transmission gear box mounted rearwardly of the clutch housing, a bearing sleeve secured to said gear box and projecting forwardly therefrom, a transmission driving shaft journaled in said bearing sleeve in axial alignment with said clutch shaft, cushioned driving connections between said shafts, a plurality of shift rods projecting from the gear box, a second socket mounting on said bearing sleeve, a lever swiveled therein and adapted to selectively actuate said shift rods, a lever swiveled in said first socket mounting, and connections between said two levers whereby movement of the lever in the first socket mounting actuates the other lever to shift the gears, said last named connections including a forked member connected to said other lever above its socket mounting.

7. In a transmission system, a clutch housing, a clutch shaft journaled therein, a socket mounting secured to said housing, a transmission gear box mounted rearwardly of the clutch housing, a bearing sleeve secured to said housing and projecting forwardly therefrom, a transmission driving shaft journaled in said bearing sleeve in axial alignment with said clutch shaft, each of said shafts having a flanged sleeve keyed thereto, connecting means between the sleeves secured to said shafts, a plurality of shift rods projecting from the gear box, a second socket mounting on said bearing sleeve, a lever swiveled therein and adapted to selectively actuate said shift rods, a lever swiveled in the first named socket mounting, connections between said two levers whereby movement of the lever in the first socket mounting actuates the other lever to shift the gears, said last named connections including a forked member connected to each of said levers and arranged when one is rocked to transmit a corresponding rocking movement to the other, a third socket mounting positioned above the first socket mounting on the clutch housing, a gear shift lever swiveled therein and having its lower end arranged to rock the lever swiveled in said first socket mounting, a slotted latch plate receiving the lower end of the gear shift lever and mounted for sliding movement in a lateral direction, restraining means associated with said plate and arranged to oppose a predetermined movement in said lateral direction, said gear shift lever being movable in the slot in said plate in a longitudinal direction, and removable spring means holding said levers in their socket mountings.

8. In a transmission system for automobiles the combination of a transmission housing including shiftable gear means, a gear shift lever, means mounting said lever intermediate its ends for universal movement and spaced from said housing, shift rods projecting from said housing, means acting as shift lugs thereon, shift means having a portion substantially in the plane of one end of said gear shift lever and adapted to selectively engage and move said shift rods, and connections between said shift means and said gear shift lever causing the above mentioned portion of said shift means to move with said end of the gear shift lever.

9. In a transmission system, a gear box, shift rods projecting therefrom, a relatively short lever movably mounted with respect to one portion of said gear box and having one end arranged to selectively engage and move said shift rods, a manually operated gear shift lever mounted in a position spaced from said gear box, a second relatively short lever movably mounted adjacent said gear shift lever and having one end connected with one end of said gear shift lever, and means constraining the first short lever to move with the second short lever, whereby movement of the gear shift lever will cause the first named short lever to selectively engage and move said shift rods.

10. In a transmission system, a gear box having a plurality of shift rods, a movable member adapted to be rocked laterally to selectively engage said rods for the purpose of shifting the same, a gear shift lever assembly mounted in a position spaced from said gear box and including a laterally rockable part, connections between said laterally rockable part and said laterally rockable member, said connections being arranged to act in torsion to cause said rockable member to execute angular movements corresponding to the angular movements of said laterally rockable part, and means for adjusting the effective length of said connections including means adapted to be tightened for holding said connections against axial displacement and means associated therewith for holding said connections against relative rotation, both when said first holding means is loose and when the same is tight.

11. In a transmission system, a gear box having a plurality of shift rods, a rockable member adapted to selectively engage and shift said rods, a gear shift lever mounted in a position spaced from said gear box, and adjustable connections between said gear shift lever and said rockable member comprising a sleeve pivoted to said rockable member for movement about a transverse axis, a second sleeve operatively connected with said gear shift lever to be actuated thereby, means disposed within and loosely connected with said sleeves and arranged when loose to prevent relative rotation therebetween, and means carried by each sleeve and adapted to be tightened to prevent relative displacement of said sleeves.

12. In a transmission system, a gear box having a plurality of shift rods, a rockable member adapted to selectively engage and shift said rods, a gear shift lever mounted in a position spaced from said gear box, and adjustable connections between said gear shift lever and said rockable member comprising a sleeve pivoted to said rockable member, a second sleeve operatively connected with said gear shift lever to be actuated thereby, means disposed within said sleeves for sliding movement with respect thereto but arranged to prevent relative rotation between the sleeves, a coupling threaded on the exterior of both of said sleeves, and means carried by each sleeve and adapted to be tightened against said coupling to prevent relative displacement of said sleeves.

13. In a transmission system, a gear box having a plurality of shift rods, a rockable member adapted to selectively engage and shift said rods, a gear shift lever mounted in a position spaced from said gear box, and adjustable connections between said gear shift lever and said rockable member comprising a sleeve pivoted to said rockable member, a second sleeve operatively connected with said gear shift lever to be actuated thereby, means disposed within said sleeves for sliding movement with respect thereto but arranged to prevent relative rotation between the sleeves, a member embracing both of said sleeves, and means threaded onto each sleeve and adapted to be tightened against said last named member to prevent relative displacement of said sleeves.

14. In a transmission system, a gear box having a plurality of shift rods, a rockable member adapted to selectively engage and shift said rods, a gear shift lever mounted in a position spaced from said gear box, and adjustable connections between said gear shift lever and said rockable member comprising a sleeve pivoted to said rockable member for movement about a transverse axis, a second sleeve operatively connected with said gear shift lever to be actuated thereby, means disposed within said sleeves to prevent relative rotation therebetween, and means disposed on the outside of said sleeves to prevent axial displacement thereof.

15. In a transmission system, a gear box having a plurality of shift rods, a rockable member adapted to selectively engage and shift said rods, a gear shift lever mounted in a position spaced from said gear box, and adjustable connections between said gear shift lever and said rockable member arranged to act in torsion to cause said member to execute angular movements corresponding to the movements of the lower end of said gear shift lever, said connections comprising a forked part pivotally connected with the gear shift lever for movement relative thereto about a transverse axis, a second forked part connected with said rockable member, and means having a non-rotatable connection with at least one of said parts and operable to adjust the effective length of said connections while maintaining the forked portions of said parts in the same plane.

16. In a transmission system, a gear box having a plurality of shift rods, a rockable member adapted to selectively engage and shift said rods, a gear shift lever mounted in a position spaced from said gear box, and adjustable connections between said gear shift lever and said rockable member arranged to act in torsion to cause said member to execute angular movements corresponding to the movements of the lower end of said gear shift lever, said connections comprising a forked part pivotally connected with the gear shift lever for movement relative thereto about a transverse axis, a second forked part connected with said rockable member, means having a key and slot connection with at least one of said parts and operable to adjust the effective length of said connections while maintaining the forked portions of said parts in the same plane, and means separate from said key and slot connection for clamping said parts in adjusted position to thereby fix the effective length of said connections.

17. In a transmission system, a gear box having a plurality of shift rods, a rockable member adapted to selectively engage and shift said rods, a gear shift lever mounted in a position spaced from said gear box, and adjustable connections between said gear shift lever and said rockable member arranged to act in torsion to cause said member to execute angular movements corresponding to the movements of the lower end of said gear shift lever, said connections comprising a part having a forked pivotal connection with said rockable member at one end and threaded at the other end, a second part having a forked pivotal connection with said gear shift lever and adapted to be threadedly connected in adjusted relation with the threaded end of said first part, whereby to vary the effective length of said connections, and a third part movable with respect to both said first and second parts and arranged to preserve the desired angular relation therebetween independently of the threaded connection of said first and second parts.

ROBERT LAPSLEY.